(12) United States Patent
Kumar

(10) Patent No.: US 8,268,737 B1
(45) Date of Patent: Sep. 18, 2012

(54) FACER AND CONSTRUCTION MATERIALS MADE THEREWITH

(75) Inventor: Ajay Kumar, Wayne, NJ (US)

(73) Assignee: Building Materials Investment Corporation, Wilmington, DE (US)

( * ) Notice: Subject to any disclaimer, the term of this patent is extended or adjusted under 35 U.S.C. 154(b) by 201 days.

(21) Appl. No.: 11/542,449

(22) Filed: Oct. 3, 2006

Related U.S. Application Data

(60) Provisional application No. 60/723,307, filed on Oct. 4, 2005, provisional application No. 60/736,690, filed on Nov. 15, 2005.

(51) Int. Cl.
*B32B 17/02* (2006.01)
*B32B 7/02* (2006.01)
*A61F 13/15* (2006.01)

(52) U.S. Cl. ..... 442/180; 428/213; 428/219; 428/904.4; 428/920; 428/921; 442/135

(58) Field of Classification Search .......... 442/178–180, 442/136; 428/219, 213
See application file for complete search history.

(56) References Cited

U.S. PATENT DOCUMENTS

| | | | | |
|---|---|---|---|---|
| 4,801,495 A * | 1/1989 | van der Hoeven | ............. | 442/412 |
| 5,001,005 A | 3/1991 | Blanpied | ..................... | 428/283 |
| 5,102,728 A | 4/1992 | Gay et al. | ..................... | 428/268 |
| 5,112,678 A | 5/1992 | Gay et al. | ..................... | 428/268 |
| 5,698,302 A | 12/1997 | Brandon et al. | ............. | 428/215 |
| 5,698,304 A | 12/1997 | Brandon et al. | ............. | 428/215 |
| 5,717,012 A | 2/1998 | Bondoc et al. | .................. | 524/13 |
| 5,776,841 A | 7/1998 | Bondoc et al. | ................ | 442/320 |
| 6,006,481 A * | 12/1999 | Jacobs | ........................ | 52/309.9 |
| 6,139,945 A * | 10/2000 | Krejchi et al. | ............. | 428/317.9 |
| 6,365,533 B1 | 4/2002 | Horner, Jr. et al. | ........... | 442/374 |
| 6,368,991 B1 | 4/2002 | Horner, Jr. et al. | ........... | 442/374 |
| 6,770,354 B2 | 8/2004 | Randall et al. | ................ | 428/219 |
| 6,774,071 B2 * | 8/2004 | Horner et al. | .................. | 442/374 |
| 2003/0032351 A1 * | 2/2003 | Horner et al. | .................. | 442/76 |
| 2004/0170873 A1 * | 9/2004 | Smith | .......................... | 428/703 |
| 2005/0066620 A1 * | 3/2005 | Albora | ........................ | 52/782.1 |
| 2005/0203205 A1 * | 9/2005 | Weine Ramsey | ............. | 522/178 |
| 2006/0019568 A1 * | 1/2006 | Toas et al. | ..................... | 442/381 |

FOREIGN PATENT DOCUMENTS

BE  835093 A  *  2/1976

* cited by examiner

*Primary Examiner* — Lynda Salvatore
(74) *Attorney, Agent, or Firm* — Alvin T. Rockhill

(57) ABSTRACT

Electron beam curable resins or ultraviolet light curable resins can be used in combination with filler and other additives to make coated facers that can be used on insulation boards. Also disclosed are facers made of such composition, the process for making said facers and their use in insulation, building and construction boards. More specifically a flexible facer can be made by a process that comprises (1) applying a monomeric composition to a fiber mat, wherein the fiber mat is a non-asphaltic, non-cellulosic fiber mat, and wherein the monomeric composition is comprised of at least one monomer and/or at least one oligomer, and a filler, (2) initiating polymerization of the monomer within the monomeric composition by exposing the monomeric composition to ultraviolet light or an electron beam, and (3) allowing the monomer to polymerized to produce the flexible facer.

17 Claims, No Drawings

FACER AND CONSTRUCTION MATERIALS MADE THEREWITH

This application claims the benefit of U.S. Provisional Patent Application Ser. No. 60/723,307, filed on Oct. 4, 2005, and United States Provisional Patent Application Ser. No. 60/736,690, filed on Nov. 15, 2005. The teachings of U.S. Provisional Patent Application Ser. No. 60/723,307 and U.S. Provisional Patent Application Ser. No. 60/736,690 are incorporated by reference herein in their entirety.

BACKGROUND OF THE INVENTION

Rigid polymeric foam insulation laminates have been used in the construction industry for many years. For instance, they have been widely used as commercial roof insulation boards which are employed under asphaltic built-up roof (BUR) membranes as well as under various single ply membranes, such as EPDM rubber, polyvinyl chloride (PVC), modified bitumen membranes, thermoplastic polyolefins (TPO's), and the like. Other uses for such rigid polymeric foam insulation laminates include residential insulation, sheathing under siding, and roof insulation under asphalt shingles and concrete tiles.

Such insulation often takes the form of a core polymeric foamed thermoset material, such as a polyurethane, a polyisocyanurate, a polyurethane modified polyisocyanurate (often referred to as polyiso) or a phenolic resin, applied between two facing sheets.

Insulation boards are generally manufactured on production lines where a liquid core chemical mixture is poured over a bottom facer, foaming up to contact a top facer in a constrained rise laminator. The reaction of the chemical mixture causing foaming is generally exothermic, as curing via polymerization and crosslinking occurs in the laminator. In the case of polyisocyanurate insulation boards, the curing exotherm lasts well into the time the resulting rigid boards are cut, stacked and warehoused. The exotherm can continue for as long as 4 days and the mixture can reach temperatures as high as 325° F.

Desirable properties for the facers include flexibility, high tensile strength, high tear strength, and resistance to thermal degradation. Facer porosity should be low and the thickness of the facer coating should be sufficient to prevent bleed-through of liquid chemicals prior to foaming. Additionally, facers should exhibit good adhesion to the core foam insulation and be inert to the effects of extraneous chemicals which may be present in the mixture, especially blowing agents that also behave as solvents. Blowing agents currently in use include chlorofluorocarbons such as HCFC-141b and R-22 as well as hydrocarbons, such as n-pentane, cyclo-pentane and iso-pentane.

One problem that has plagued the polyiso industry has been a phenomenon called "cold temperature delamination". This phenomenon occurs in cold temperature areas where insulation boards coming off the production line cool before they can be "stack cured". In a worst case scenario, the polyiso core foam layer closest to the facer cools, quenching the cure reaction and leaving a brittle layer. This often leads to shearing of the core layer or facer peel off. It has been the practice of manufacturers to place a layer of corrugated cardboard over both the top facer surface of the top board and under the bottom facer surface of the bottom board in the stack, to retain exothermic heat and prevent subsequent delamination. Thus, a facer that inherently insulates and retains heat during stack cure would materially reduce incidents of cold temperature delamination and would eliminate the need for costly cardboard insulation.

After foamed polymer insulation boards are cured, cut and shipped to their use site, the facer should provide mechanical stability as well as water and weather resistance since, upon installation, they may be exposed to persistent rain, high humidity, ultraviolet light and excessive heat. Additionally, the facers must be puncture and scuff resistant to survive being fastened, e.g., by screws or nails, and walked on. Withstanding temperatures up to 500° F., as encountered in hot asphalt applications, as well as resistance to the deleterious effects of adhesive solvents used in single ply and cold applied roofing membrane applications while strongly bonding to the adhesives themselves are also important facer properties.

Traditionally, facer materials have included asphalt saturated cellulosic felts, fiberglass mats, asphalt emulsion coated fiberglass mats, aluminum foil/Kraft/foil, glass fiber modified cellulosic felts, glass mats onto which polymeric films have been extruded, and glass mats coated with polymeric latex/inorganic binder coatings. However, all of these materials have at least one undesirable property. For example, asphalt-containing products are not compatible with PVC single ply roofing membranes. Fiberglass mats are subject to excessive bleed-through of foamable core chemicals. Aluminum facers and foils reflect heat into the foam during processing which leads to disruption of cell structure, delamination and warping. Further, foil faced sheathing and extrusion or lamination of a polymer film to glass mat surfaces are costly. Specifically, glass mats coated with polymer latex/inorganic binder mixtures have been found to be brittle; conversely, glass fiber modified cellulosic felts are susceptible to moisture absorption aggravating board warping in damp or wet environments.

Other facers which have been employed for siding underlayment and insulation board facers include those disclosed in U.S. Pat. No. 5,776,841 and U.S. Pat. No. 5,717,012, which are primarily felts. U.S. Pat. No. 5,776,841 concerns a light weight sheet felt material suitable for use as roof and siding underlayment and insulation board facing which comprises on a dry basis (a) 60-80 weight percent cellulose fibers; (b) 15-30 weight percent glass fibers having a diameter of 5 to 16 microns and a length of ⅜-¾ inch; (c) 4-10 weight percent binder and (d) 0.5-10 weight percent non-asphaltic, sizing agent having a flash point above 150° F. and an evaporation rate less than one which is selected from the group consisting of anionic rosinous and amphipathic ester and anhydride sizes and mixtures thereof. The felt of U.S. Pat. No. 5,776,841 is of considerably lighter weight and higher porosity than other felting materials used for the same purpose and can be supplied in longer continuous sheet rolls than heretofore practical from a standpoint of handling, shipping, storage, and installation. Also the sheet felt of U.S. Pat. No. 5,776,841 can be produced on conventional felt making equipment in a one step process.

U.S. Pat. No. 5,001,005 describes a facing sheet composed of glass fibers and a non-asphaltic binder. The facer of U.S. Pat. No. 5,001,005 contains 60 percent to 90 percent glass fibers, which high fiber content does not provide sufficient binder to close the sheet's pores or to provide desired sheet strength. U.S. Pat. No. 5,102,728 describes a glass mat substrate coated with a polymeric latex blended with an asphalt emulsion, concerns a product which is not only incompatible with PVC roofing membranes but also requires excessive coating thicknesses to reduce high porosity. Accordingly, this product is very costly. U.S. Pat. No. 5,112,678 discloses a facer prepared by applying to a fiberglass mat a flowable polymer latex and an inorganic binder coating. The resulting product is somewhat brittle and is susceptible to an undesirable degree of chemical bleed through. U.S. Pat. No. 5,698,302 and U.S. Pat. No. 5,698,304 describe facers where polymer films are laminated or extruded onto fiberglass mat. Not only is this approach costly, but also since conventional mineral flame retardant filled polymers do not extrude well, some degree of resistance to flammability must be sacrificed.

U.S. Pat. No. 6,365,533, U.S. Pat. No. 6,368,991, and U.S. Pat. No. 6,774,071 describe a low fiber, plyable facer suitable for use in the construction industry, particularly for insulation board manufacture, comprising a dry preformed fiber mat containing a binder for the fibers, preferably a preformed glass mat, coated with a prefoamed composition which contains a polymer latex, a foam sustaining amount of a surfactant and a flame retarding and/or strengthening amount of a mineral filler and also to the use and process for the preparation of the above as well as to a siding underlayment or insulation board having a foamed, thermosetting resin core which is surfaced with said facer as a product for commercial use. These patents further describe a dry flexible facer comprising a non-asphaltic, non-cellulosic fiber mat surfaced with a cured foam comprising (a) between about 15 and about 80 weight percent of a polymer latex, (b) between about 0.01 and about 80 weight percent of a mineral filler and (c) between about 0.5 and about 10 weight percent of a foam supporting surfactant, and (d) between about 0.01 and about 5 weight percent of a catalyst.

Gypsum construction boards are widely used in building construction. Gypsum construction boards typically include a set gypsum core that is sandwiched between two facers. However, in some cases the gypsum core has a facer that is affixed to only one of its two sides.

United States Patent Application Publication 2005/0203205 discloses a composition of matter incorporating nanotechnology with UV curable materials for the coating of fiberglass. This patent publication more specifically discloses a one-part, substantially solvent-free coating composition for applying to fiberglass substrates, consisting essentially of: a polymerizable compound which comprises a mixture of acrylates, photoinitiator or a photoinitiator mix, silicon dioxide monospheres, and surfactant or mixture of surfactants. United States Patent Application Publication 2005/0203205 further reveals a composition of matter comprising UV curable materials incorporating nanotechnology for the coating of fiberglass This patent publication further discloses a one-part, substantially solvent-free coating composition for applying to a substrate, consisting essentially of: from about 60 percent to 80 percent by weight, based on total composition weight, of a polymerizable compound which comprises a mixture of acrylates, the acrylate mixture comprising an aliphatic urethane acrylate and a mixture of acrylate monomers, from 10 percent to 30 percent silicon dioxide monospheres of a diameter of approximately 20 nanometers, and from about 1 percent to 10 percent of an organic photoinitiator which initiates a polymerization reaction in the composition when it is exposed to ultraviolet light, without the use of added heat for either evaporation or postcure.

SUMMARY OF THE INVENTION

It is an object of this invention to overcome the above described disadvantages and deficiencies of prior art facers and to provide a facer which is economically produced by a commercially feasible process. It is also an object of this invention to provide a mechanically stable facer suitable for insulation board manufacture which resists cold temperature delamination and which has superior tolerance to the effects of weathering. It is another object of this invention to provide a facer which exhibits superior adhesion to polyiso foam of an insulation board core material. These and other objects and advantages of the invention will become apparent from the following description and disclosure.

This invention relates to facers used for the production of construction materials, such as insulation and other construction boards. Such boards can be composed, in part, of foam insulation, such as but not limited to, polyurethane, polyurethane-polyisocyanurate hybrid, polyphenolic, expanded polystyrene, extruded polystyrene, and polyisocyanurate. Such boards can also be composed of gypsum, cement or concrete, mineral fiber, fiberglass, wood, cellulose or any other board used in structural and non-structural building materials. The facer of this invention also can be used as or in conjunction with underlayments or siding used in buildings.

Insulation boards made from polyurethane, polyurethane-polyisocyanurate hybrid, expanded polystyrene, gypsum and/or other materials with a facer on one or both sides of the core are well known in building industry. Historically, paper based facers have been used to make these boards. However, more recently fiberglass-mat based facers have been used in the industry. Fiberglass-mat based facers have been produced by coating glass-mat with water-based coatings and are considered to have good dimensionally stability, fungal resistance and other advantages. Such glass-mat based facers produced from water-based coatings also have certain disadvantages. The invention produces a better facer with some or all of the following advantages over facers made by applying water or solvent based coatings on glass-mat: (1) environmentally friendly, (2) lower energy costs, (3) excellent water, chemical, and stain resistance, (4) excellent abrasion, scratch, and scuff resistance, (5) good exterior durability, (6) smaller production space, (7) increased productivity, (8) potentially lower applied coating costs, (9) temperature resistance, and (10) allows for the utilization of heat sensitive substrates.

This invention calls for application of electron beam or ultraviolet light curable resin-based coating compound on a substrate like fiberglass-mat, polyester fiber mat or other substrate and cure of the coating by using an electron beam source to develop facers that can be used with, but not limited to, foam insulation boards composed in part with polyurethane, polyurethane-polyisocyanurate hybrid, polyphenolic, expanded polystyrene, extruded polystyrene and/or polyisocyanurate. The facer of this invention can also be used for construction boards composed of gypsum, cement or concrete, mineral fiber, glass wool, fiberglass, wood, cellulose or any other material used in structural and non-structural building boards. Such construction boards may be rigid, semi-rigid or flexible.

In the practice of this invention the coating can be applied on one or both sides of the said substrates to develop underlayments that can be used in roofing, siding, flooring, walls and elsewhere in buildings. In one preferred composition, the coating compound will include one or more electron beam or ultraviolet curable resins and one or more organic/inorganic fillers. It may also include additives such as, but not limited to, flow and leveling agents, wetting and dispersing agents, defoamer, pigment, biocide and/or other agents known to those skilled in the art.

Preferred electron beam (EB) or ultraviolet (UV) curable resins are composed of a mixture of at least one monomer and/or at least one oligomer. The monomer chemistry will be based on acrylate and/or methacrylate or other known monomers and oligomer chemistry will be based on epoxy acrylate, urethane acrylate, polyester acrylate or other known oligomers. Monomer and oligomer chemistries may have a mono, di, tri, tetra, penta or higher functionality. Their backbone chemistry may include, but is not limited to, an alkane, ester, ether, aliphatic, aromatic and/or any other chemistry. The invention provides a fast curing process and polymerization of reactive molecules is done by the action of electron beam or ultraviolet light. This process offers the potential for 100% reactive ingredients. The coating compound may be applied on the substrate by spraying, roll coating, knife coating, air-knife coating or any other known processes used by those skilled in the art.

The coating compound may also be foamed, if required, with air by applying surfactant chemistries or other blowing agents before applying to the substrate and blowing agents may be chemical, physical or a combination of the two. The present invention also allows for making facers or underlayments with or without conventional fire retardants and/or biocides as well as nanoparticle biocides like nano-silver or other in coating formulation. In practicing the process of this invention an electron beam or ultraviolet light may be applied to one or both sides of the facer to initiate polymerization of the polymers/oligomers in the monomeric composition utilized in manufacturing the facer.

This invention more specifically discloses a process for manufacturing a flexible facer comprising (1) applying a monomeric composition to a fiber mat, wherein the fiber mat is a non-asphaltic, non-cellulosic fiber mat, and wherein the monomeric composition is comprised of a monomer and a filler, (2) initiating polymerization of the monomer within the monomeric composition by exposing the monomeric composition to ultraviolet light or an electron beam, and (3) allowing the monomer to polymerized to produce the flexible facer.

The present invention further reveals an insulation board having a non-elastic core and having at least one surface thereof bonded to an uncoated surface of a facer, wherein the facer is made by a process comprising (1) applying a monomeric composition to a fiber mat, wherein the fiber mat is a non-asphaltic, non-cellulosic fiber mat, and wherein the monomeric composition is comprised of a monomer and a filler, (2) initiating polymerization of the monomer within the monomeric composition by exposing the monomeric composition to ultraviolet light or an electron beam, and (3) allowing the monomer to polymerized to produce the flexible facer.

The subject invention also discloses a facer-reinforced gypsum board comprising a set gypsum containing core having adhered thereto a facer, wherein the facer is made by a process comprising (1) applying a monomeric composition to a fiber mat, wherein the fiber mat is a non-asphaltic, non-cellulosic fiber mat, and wherein the monomeric composition is comprised of a monomer and a filler, (2) initiating polymerization of the monomer within the monomeric composition by exposing the monomeric composition to ultraviolet light or an electron beam, and (3) allowing the monomer to polymerized to produce the flexible facer.

The present invention further reveals a process of manufacturing a construction board which comprises (1) positioning a wet gypsum composition between a first facer and a second facer to make a laminated sheet of wet construction board, wherein the first facer is made by the process comprising (i) applying a monomeric composition to a fiber mat, wherein the fiber mat is a non-asphaltic, non-cellulosic fiber mat, and wherein the monomeric composition is comprised of a monomer and a filler, (ii) initiating polymerization of the monomer within the monomeric composition by exposing the monomeric composition to ultraviolet light or an electron beam, and (iii) allowing the monomer to polymerized to produce the flexible facer, and (2) heating the laminated sheet of wet construction board to a temperature which is within the range of 200° F. to 700° F. for a period of time which is sufficient to reduce the moisture content of the gypsum to be within the range of 18 to 25 percent. The wet gypsum composition typically has a moisture content which is within the range of about 40 percent to about 60 percent. The laminated sheet of wet construction board is typically heated to a temperature which is within the range of 200° F. to 700° F.

The subject invention also discloses a construction board which is comprised of a rigid sheet and a facer, wherein the facer is bonded to at least one side of said rigid sheet, wherein the rigid sheet is comprised of a member selected from the group consisting of gypsum, blown polystyrene, and polyisocyanurate, and wherein the facer which is made by a process comprising (1) applying a monomeric composition to a fiber mat, wherein the fiber mat is a non-asphaltic, non-cellulosic fiber mat, and wherein the monomeric composition is comprised of a monomer and a filler, (2) initiating polymerization of the monomer within the monomeric composition by exposing the monomeric composition to ultraviolet light or an electron beam, and (3) allowing the monomer to polymerized to produce the flexible facer. In most cases the facer will be bonded to both sided of the rigid sheet.

DETAILED DESCRIPTION OF THE INVENTION

The fibers of the mat employed in the process of this invention will typically be fibers of glass, polyester, polypropylene, polyester/polyethylene/teraphthalate copolymers, hybrid types such as polyethylene/glass fibers and other conventional non-cellulosic fibers. Mats having glass fibers in random orientation are preferred for their resistance to heat generated during the manufacture of insulation boards and flame resistance in the finished product. The fiber mats utilized in the practice of this invention will typically be a non-asphaltic, non-cellulosic fiber mat, such as glass mats.

The fibrous mats employed in the practice of this invention, generally are between about 10 mils and about 40 mils in thickness. The fiber mat will typically weigh from 3 $g/ft^2$ to 12 $g/ft^2$ (before being coated). The fiber mat used will more typically weight from 4 $g/ft^2$ to 9 $g/ft^2$ and will preferable weigh from 5 $g/ft^2$ to 8 $g/ft^2$ (before being coated). It is preferred for the mats to be comprised of glass fibers that have a diameter which is within the range of about 3 microns to about 20 microns and most desirably which is within the range of 10 microns to 18 microns. The glass fibers will typically be from about 0.25 inch to about 1.75 inches in length and will desirably be of 0.75 inch to 1.5 inches in length.

The fillers useful in the present coating mixture include conventional inorganic types such as clays, mica, talc, limestone, kaolin, other stone dusts, gypsum, aluminum silicate (e.g. Ecca Tex 561 or Kaoplate C), flame retardant aluminum trihydrate, ammonium sulfamate, antimony oxide, calcium silicate, calcium sulfate, zinc borates, colemanite, and mixtures thereof.

The monomer chemistry utilized in the monomeric composition will be based on acrylate and/or methacrylate or other known monomers. The oligomer chemistry utilized will typically be an epoxy acrylate, a urethane acrylate, a polyester acrylate or any other known oligomer. Some representative examples of suitable monomers include tetrahydrofuryl acrylate (THFA), N,N-dimethyl acrylamide (DMA), 2-hydroxyethyl methacrylate (HEMA), and hydroxybutyl acrylate (HBA). Hydroxypropyl acrylate (HPA), methacrylates corresponding to the foregoing acrylate compounds, alkoxylated counterparts to the foregoing, other acrylates and acrylamides containing reactive hydroxy groups, and carbon and nitrogen-substituted analogs of the indicated acrylamides should also produce good results. Needless to say, mixtures of two or more of the designated compounds can be utilized as the monomer. Oligomers of these monomers can, of course, also be utilized. For instance, the monomer/oligomer constituent of the monomeric composition can be a mixture of an aliphatic urethane acrylate and various acrylate monomers. Some representative examples of acrylate monomers that can be used include isobornyl acrylate, tetrahydrofurfuryl acrylate, propoxylated glyceral triacrylate, hexandiol diacrylate, dipropylene glycol diacrylate, tripropylene glycol diacrylate, neopentyl glycol propoxylate diacrylate, trimethylopropane triacrylate, trimethylopropane ethoxylate triacrylate, pentaerythritol alkoxylate tetraacrylate, and dimethylopropane tetraacrylate.

Optional ingredients in the monomeric composition include acidic adhesion promoters (preferably crotonic acid, acrylic acid, methacrylic acid, itaconic acid, and maleic acid), normally used in a concentration of about 1.0 weight percent to 5.0 weight percent, cross-linking agents to adjust hardness (e.g., trimethanolopropane triacrylate [TMPTA] and 1,6-hexanediol diacrylate [HDDA]), normally used in concentrations of about 1 to 5 weight percent, and heat and product stabilizers, normally used, alone or together, in a total concentration of about 0.1 weight percent to 4 weight percent.

There are two general classes of photoinitiators. These classes of photoinitiators include Type I photoinitiators (unimolecular photoinitiators) and Type II photoinitiators (by molecular photoinitiators). Type I photoinitiators undergo a unimolecular bond cleavage upon irradiation to yield free radicals. Type II photoinitiators undergo a bimolecular reaction where the excited state of the photoinitiator interacts with a second molecule (a coinitiator) to generate free radicals. Both of these types of photoinitiators can be used in used in the monomeric composition utilized in making facers by the process of this invention. Some representative examples of electron transfer photoinitiators that can be used include benzophenone, diphenoxy benzophenone, halogenated and amino functional benzophenones, fluorenone derivatives, anthraquinone derivatives, zanthone derivatives, thioxanthone derivatives, camphorquinone, benzil. Some representative examples of photofragmentation photoinitiators that can be used include alkyl ethers of benzoin, benzyl dimethyl ketal, 2-hydroxy-2-methylphenol-1-propanone, 2,2-diethoxyacetophenone, 2-benzyl-2-N,N-dimethylamino-1-(4-morpholinophenyl)butanone, halogenated acetophenone derivatives, sulfonyl chlorides of aromatic compounds, acylphosphine oxides, bis-acylphosphine oxides, and benzimidazoles.

Photoinitiators that are suitable for use in the practice of this invention are commercially available from a wide variety of suppliers. Some representative examples of photoinitiators that are commercially available from Sartomer include Esacure KB-1 benzyl dimethyl ketal; Esacure 1001M 1-[-(4-benzoylphenylsulfanyl)phenyl]-2-methyl-2-(4-methylphenylsulfonyl)propan-1-one; Esacure KS3001-hydroxy-cyclohexyl-phenyl-ketone; Esacure TPO 2,4,6-trimethylbenzoyldiphenylphosphine oxide; Esacure EHA 2-ethylhexyl-4-dimethyl amino benzoate; Esacure KL200 2-hydroxy-2-methyl-1-phenyl-1-propanone; benzophenone; Esacure One difunctional α-hydroxy ketone; Esacure EDB ethyl-4-(dimethylamino)benzoate; and Esacure ITX isopropyl thioxanthone. Some representative examples of photoinitiators that are commercially available from Dow Chemical include Cyracure UVI-6992 phosphate-based triarylsulfonium salts and Cyracure antimonate-based triarylsulfonium salts. Some representative examples of photoinitiators that are commercially available from Mayzo include Benacure® 184 1-hydroxy-cyclohexyl-phenyl-ketone, Benacure® 651 2,2-dimethoxy-1,2-diphenylethan-1-one, Benacure® BP benzophenone (diphenyl ketone), and Benacure® 1173 2-hydroxy-2-methyl-1-phenyl-1-propanone.

In some cases it may be beneficial to utilize a blend of various photoinitiators to initiate polymerization to cure the monomeric composition. Some blends of this type that are commercially available from Sartomer include: Esacure TZT photoinitiator blend of trimethylbenzophenone and methylbenzophenone, Esacure KIP 150 photoinitiator blend of oligo (2-hydroxy-2-methyl)-1-4-(1-methylvinyl)phenyl propanone and 2-hydroxy-2-methyl-1-phenyl-1-propanone (polymeric), and Esacure KTO46 photoinitiator blend of phosphine oxide, trimethylbenzophenone, methylbenzophenone, oligo(2-hydroxy-2-methyl)-1-4-(1-methylvinyl)phenyl propanone, and 2-hydroxy-2-methyl-1-phenyl-1-propanone (polymeric).

The monomeric composition used in the practice of this invention will typically contain from 5 weight percent to 90 weight percent monomers/oligomers and from 5 to 95 weight percent fillers. In cases where the monomeric composition will be cured by use of an electron beam the filler will preferably be present in the monomeric composition at a level of 30 weight percent to 85 weight percent with the monomers and/or oligomers being present at a level which is within the range of 15 weight percent to 70 weight percent. In cases where the monomeric composition will be cured by use of an electron beam the filler will more preferably be present in the monomeric composition at a level which is within the range of 50 weight percent to 80 weight percent with the monomers and/or oligomers being present at a level which is within the range of 20 weight percent to 50 weight percent. In cases where the monomeric composition will be cured by use of ultraviolet light the filler will preferably be present in the monomeric composition at a level of 20 weight percent to 80 weight percent with the monomers and/or oligomers being present at a level which is within the range of 20 weight percent to 80 weight percent. In cases where the monomeric composition will be cured by use of ultraviolet light the filler will more preferably be present in the monomeric composition at a level which is within the range of 50 weight percent to 70 weight percent with the monomers and/or oligomers being present at a level which is within the range of 30 weight percent to 50 weight percent.

The monomeric composition used in the practice of this invention will typically be void of silicon dioxide monospheres. More specifically, the monomeric composition will normally be free of silicon dioxide monospheres having a diameter of approximately 20 nanometers (within the range of 15 to 25 nanometers).

In one embodiment of this invention a foaming agent is included in the monomeric composition to produce a foamed coating structure. Air or some other gas, such as nitrogen or carbon dioxide, can also optionally be aerated or blown into the monomeric composition to produce a foamed coating structure. A gas can typically be incorporated into the monomeric composition by blowing, sparging, or mixing the gas therein with vigorous agitation. This can be done in the presence or absence of one or more conventional blowing agents and/or foaming agents. In cases where a gas is blown into the monomeric composition it will be formulated to have a sufficient viscosity to hold bubbles of the gas therein until polymerization and/or crosslinking has occurred to produce an essentially solid foamed structure. Generally the amount of the gas, such as air, incorporated into the monomeric composition will be between about 5 percent and about 90 percent by volume for optimal consistency and the resulting foamed mixture will optimally have bubble openings that are sufficiently small so as to inhibit liquid bleed through the mat. More typically, the amount of gas incorporated into the monomeric composition will be between about 20 percent and about 85 percent by volume. It is normally preferred for the amount of gas incorporated into the monomeric composition to be within the range of about 60 percent and about 80 percent by volume.

In any case, the foamed or un-foamed monomeric composition is applied to the fiber mat. The monomeric composition is normally applied onto the fiber mat to a thickness of from about 1 mil to about 100 mils, preferably 2 mils to 10 mils. This can be accomplished by coating the preformed mat surface with the monomeric composition under ambient conditions using a knife blade, air knife, roller, sprayer, or any other convenient method of application. The coating weight of the monomeric composition applied to the fiber mat will typically be within the range of about 2 $g/ft^2$ to about 40 $g/ft^2$. The coating weight of the monomeric composition applied to the fiber mat will more typically be within the range of about 3 $g/ft^2$ to about 20 $g/ft^2$, and will preferably be within the range of 4 $g/ft^2$ to about 10 $g/ft^2$.

The coated fiber mat is then exposed to ultraviolet light or an electron beam to initiate polymerization of the monomers and/or oligomers in the monomeric composition that was applied to the fiber mat. In cases where ultraviolet light is employed as the initiator a photoinitiator will be included in the monomeric composition that is applied to the fiber mat. However, a photoinitiator is not needed in cases where polymerization is initiated with an electron beam. This is typically accomplished by passing the coated fiber mat through a zone where it is exposed to ultraviolet light or an electron beam. It is normally advantageous to do this on a continuous basis. However, the coated fiber mat can optionally be exposed to the ultraviolet light or the electron beam on a discontinuous basis. In any case, the monomers and/or oligomers polymerize to produce a coated mat having a thickness of up to about 100 mils. The weight of the facers of this invention can vary from about 40 $g/m^2$ to about 300 $g/m^2$ and the facer sheet will typically have a thickness of about 40 mils to about 90 mils depending on the preference of the consumer.

The resulting facer product of this invention is desirably flexible and possesses low permeability to liquid chemicals. The facers of this invention accordingly can provide protection for the cores of insulation boards and construction boards. The facers of this invention also provide superior dimensional stability and high tensile strength.

Applying a film or laminating a layer of impervious resin or polymer over the surface of the facer to provide a trilayered facer member can provide a totally liquid impervious surface on the facer, in special situations where that is a need for high liquid barrier resistance. A top seal coat of a non-foamed latex is suitable for this purpose. Alternatively, a thermoplastic such as polyethylene powder or unexpanded polystyrene beads can be used as a filler and melted at an elevated temperatures to close substantially all pores of the pervious coating. Expandable excipients and additives such as cellulose can also be used for this purpose; although the use of a seal coat is neither needed nor recommended. Other methods for accomplishing the similar purpose include the use of less air during foaming, the omission or use of less inorganic filler in the coating composition, calendering and/or embossing the foamed or frothed surface by contact with a hot roller or platen. A combination of any of the above options can be employed for specialized purposes if desired.

The insulation boards, for which the facers of this invention are particularly suited, comprise conventional thermosetting or thermoplastic foam cores, such as foamed polyurethane or polyurethane modified polyisocyanurate or phenol-formaldehyde cores disposed between a pair of facer members which are laminated to the core surfaces. Other non-elastomeric foamable chemicals, such as polyvinyl chloride, polystyrene, polyethylene, polypropylene, and others conventionally employed as core material can also be employed as the insulation board core of this invention. Rigid foamed cores of this type are described, for example, in U.S. Pat. No. 4,351,873. The teachings of U.S. Pat. No. 4,351,873 are incorporated herein by reference.

The present facers are also suitable for sheathing generally of a thickness up to about 1 inch and composed of a non-elastic core material. The use of the facers of this invention eliminates the need for expensive foil facings which hold and reflect heat and often cause warping and deterioration of wood overlayment. Also, foil and similar facings are easily punctured which gives rise to moisture attack.

In the insulation manufacture, a roll of the present foamed facer sheet product is passed, with its uncoated fiber surface opposite the core surface, to a laminating zone. The board core foam precursor chemical or mixture of chemicals can be poured onto the non-coated fiber surface of the facer sheet or the core of the insulation board can be prefoamed to a self-sustaining consistency. In one embodiment, a first facer of this invention, with its uncoated surface abutting the core, is placed below the core. The fiber surface of a second facer is positioned and spaced above the core to allow for core expansion, e.g. in a constricted rise laminator, where the assembly undergoes an exothermic reaction and curing is initiated or in a free-rise application. During the curing operation the core material foams and rises to engage the lower uncoated surface of the second facer. It is to be understood that one of the first and second facers can be of the same or of a different composition than that of this invention; although it is preferred that both of these facers be those of the invention described herein. More specifically, one of the facer sheets may be selected from those conventionally employed, such as for example a cellulose or cellulose-glass hybrid felt sheet, perlite, aluminum foil, multilaminated sheets of foil and Kraft, uncoated or coated fiber glass mats; although the second facer sheet of the present invention enhances the advantages described herein. As the core foam is spread on the fibrous surface of the first facer sheet entering the laminator, it undergoes an exothermic reaction which can attain a temperature up to about 200° F. The core foam rises to contact the undersurface of the second facer and hardens thereon; thus providing a rigid insulating foam core interposed or sandwiched between two facer sheets. The resulting product can then be cut into boards of desired size and shape. The heat of the exothermic reaction involving polymerization and/or crosslinking, is autogenerated in both the laminator and in the subsequent stacking of insulation boards to insure complete curing of the core and surface coating of the facer. Curing temperatures during stacking can rise up to about 325° F. over a period of up to 4 days.

As another embodiment involving the above operation, the top and bottom positioning of the facer sheets can be reversed so that the facer of this invention is fed and spaced above a conventional facer in a manner such that its non-coated fibrous surface faces the foamable insulating core chemical being contacted on its under surface with another facer sheet. The later procedure is practiced where one facer is a rigid sheet, as in a perlite or particle board facer as opposed to the flexible facer of this invention which can be fed to the laminator as a continuous roll. In this case the foamable insulating core chemical is surfaced on the rigid facer member and rises to engage the fibrous uncoated surface of the present facer.

The insulation boards incorporating the facers of this invention are useful in commercial roof insulation, residential or commercial wall sheathing etc. Depending upon the intended use, the present insulation board has a core thickness which may vary widely, for example between about 0.5 inch and about 6 inches or more. The insulation board will more typically have a core thickness which is within the range of 1 inch to 4 inches.

In the above discussion, it will become apparent that it is also possible to form the insulation core separately, i.e. absent contact with the fibers of a facer, and subsequently bond one or more of the present facers to the core using suitable adhesives. In general, the teachings of U.S. Pat. No. 4,351,873 are applicable to the formation of rigid foam cores and adhesion of facer sheets to at least one surface of such cores. The teachings of U.S. Pat. No. 4,351,873 are incorporated herein by reference.

Polyurethane or polyisocyanurate are most commonly employed as core materials; although other non-elastomeric, foamable chemicals can also be employed. Examples of the later include polyvinyl chloride, polystyrene, phenolic resins and the like.

The facers of this invention finds utility in fiberglass mat reinforced gypsum boards and the use of such boards in, e.g., exterior insulation systems (EI Systems). Such boards comprise a set gypsum-containing core having at least one sheet of the facer of this invention adhered to the set gypsum core by a portion of the set gypsum. The gypsum containing core can be sandwiched between two sheets of the facer of this invention. Such boards can be manufactured by methods known in the art, such as, for example, methods described in U.S. Pat. No. 4,647,496. The teachings of U.S. Pat. No. 4,647,496 are incorporated herein be reference for the purpose of teaching applicable methods of manufacturing gypsum boards utilizing the facers of this invention. The facers of this invention also find utility on boards comprised of a cement core. Such boards can be used as a bonding substrate for, e.g., the application of tiling. The boards are fastened to walls, floors, countertops, and the like, adhesive is applied to the board and the tiles are pressed into the adhesive.

Gypsum construction board can be made with the facers of this invention by a process that comprises (1) positioning a wet gypsum composition between a first facer and a second facer to make a laminated sheet of wet construction board, wherein the first facer is made by the process comprising (i) applying a monomeric composition to a fiber mat, wherein the monomeric composition is comprised of a monomer and a filler, (ii) initiating polymerization of the monomer within the monomeric composition by exposing the monomeric composition to ultraviolet light or an electron beam, and (iii) allowing the monomer to polymerized to produce the flexible facer, and (2) heating the laminated sheet of wet construction board to a temperature which is within the range of 200° F. to 700° F. for a period of time which is sufficient to reduce the moisture content of the gypsum to be within the range of 18 to 25 percent. The wet gypsum composition typically has a moisture content which is within the range of about 40 percent to about 60 percent. The laminated sheet of wet construction board is typically heated to a temperature which is within the range of 200° F. to 700° F. The heating step will normally be conducted for a period of about 5 minutes to about 120 minutes. The laminated sheet of wet construction board will more typically be heated to a temperature which is within the range of about 400° F. to about 600° F. for a period of about 30 minutes to about 60 minutes. In any case, the moisture content of the gypsum will be reduced from a level of about 50% to a level which is within the range of about 18% to about 25%. The moisture content of the gypsum will typically be reduced to a level of about 21%. The general procedure of manufacturing gypsum boards described in U.S. Pat. No. 6,770,354 can be implemented in the practice of this invention. The teachings of U.S. Pat. No. 6,770,354 are incorporated herein by reference.

This invention is illustrated by the following examples that are merely for the purpose of illustration and are not to be regarded as limiting the scope of the invention or the manner in which it can be practiced. Unless specifically indicated otherwise, parts and percentages are given by weight.

EXAMPLE

In order to develop a facer based on an ultraviolet curable binder based coating, an aliphatic polyester based urethane diacrylate oligomer blended with 25% ethoxylated trimethylated trimethylol propane triacrylate (CN964E75), a monofunctional acid ester (CD9050) used as a adhesion promoting monomer, 2(2-ethoxyethoxy)-ethyl acrylate mono functional monomer (SR 256), 1,6 hexanediol diacrylatemonomer low viscosity monomer (SR238), photoinitiator Esacure KTO KTO46 which is a blend of phosphine oxide, alpha-hydroxy ketone and a benzophenone derivative and a inorganic kaoline dry filler (Kaowhite from Thiele) was prepared. The proportions of these constituents utilized in making the ultraviolet curable binder based coating are shown in Table 1.

As can been seen from Table 1, all the materials used in making the ultraviolet curable binder composition were 100% solids. The ultraviolet curable binder composition was formulated in the laboratory and applied on a glass mat having a basis weight of 78 g/m$^2$ using a lab coater. The coated sheets were cured by using a lab unit consisting of a 400 watt UV lamp at a speed of 20 feet per minute. The coating was applied to the glass-mat at a level of about 34 g/ft$^2$ on a dry basis. The total weight of the finished sheet was around 40 g/ft$^2$.

Hand sheets were tested for water holdout, cure, caliper, air porosity and strength properties. The results are shown in Table 2. This technique of manufacturing facers offers the advantage of not emitting any solvents, such as volatile organic compounds (VOCs) or water during drying and curing. The process of this invention also offers the advantage of utilizing relatively inexpensive fillers, such as kaoline, which reduces the cost of production such facers significantly. The process of this invention accordingly offers an environmentally friendly technique for manufacturing facers that has low energy requirements. The facers made by this process exhibit excellent water and chemical resistance as well as good exterior durability. Facers can be produced by the process of this invention on very compact lines as compared to conventional lines that requires hot air circulated in large scale ovens. This process for manufacturing facers by the technique of this invention also allows for the incorporation of heat sensitive substrates. This is not possible in conventional facer manufacturing techniques due to heat distortion that occurs by virtue of the high temperatures that are experienced during the process.

The proposed facer can be used with, but not limited to, foam insulation boards composed in part with polyurethane, polyurethane-polyisocyanurate hybrid, polyphenolic, expanded polystyrene, extruded polystyrene and/or polyisocyanurate. As can be seen from Table 2, the facer made in this experiment offered excellent physical characteristics.

TABLE 1

Formulation 1

| Formulation 1 | % solids | % Contribution |
|---|---|---|
| CN 964E75 | 100 | 50 |
| CD 9050 | 100 | 7 |
| SR 256 | 100 | 10 |
| SR 238 | 100 | 10 |
| ESACURE KTO 46 @ Benzophenon | 100 | 3 |
| Kaowhite | 100 | 20 |
| | | 100 |

TABLE 2

Hand sheet results based on formulation 1

| Property | Value |
|---|---|
| Basis weight, g/ft² | 40.3 |
| Cure** | 0.0 |
| Water holdout*, minutes | 60+ |
| Caliper, mils | 0.035 |
| Air porosity, 325 Pa (cm³/cm²/s) | 33.1 |
| Tensile MD, lb/inch (ASTM D828-97) | 76.2 |
| Tensile CMD, lb/inch (ASTM D828-97) | 42.8 |
| Tear MD, gf | 323.5 |
| Tear CMD, gf | 487.4 |

*In the water withhold test, a drop of water (about 0.25 inch to 0.5 inch in diameter) was placed on the coated side of the facer and the time was measured for the water to get through the sample and to bee seen on the other side.

**Cure was measured by cutting the facer made into samples having a size of 1 inch by 6 inches. Two facer samples are pressed together with the coated sides of the facer samples facing each other and heated in a press at 225° F. for 2 minutes at 1 ton of pressure. Then the samples are separated at the end of the test. The samples are rated from 0 to 5 on the basis of peel-off characteristics. A rating of 0 is considered to be the best and 5 is considered to be the worst when the two strips are peeled apart.

While certain representative embodiments and details have been shown for the purpose of illustrating the subject invention, it will be apparent to those skilled in this art that various changes and modifications can be made therein without departing from the scope of the subject invention.

What is claimed is:

1. An insulation board having a non-elastic core and having at least one surface thereof bonded to an uncoated surface of a facer, wherein the insulation board has a thickness which is within the range of 0.2 inches to about 6 inches, wherein the non-elastic core is comprised of a foamed polymer selected from the group consisting of foamed polyurethane modified polyisocyanurate and foamed phenol-formaldehyde, wherein the facer is manufactured by a process comprising (1) applying a monomeric composition to a fiber mat, wherein the fiber mat is a non-asphaltic, non-cellulosic fiber mat, and wherein the monomeric composition is comprised of a monomer and a filler, wherein the monomer is selected from the group consisting of acrylate monomers and methacrylate monomers, wherein the monomeric composition is void of photoinitiators, wherein the monomeric composition consists substantially of solids, (2) initiating polymerization of the monomer within the monomeric composition by exposing the monomeric composition to an electron beam, and (3) allowing the monomer to polymerize to produce the flexible facer.

2. The insulation board of claim 1 wherein the monomeric composition is further comprised of a polymerizable oligomer.

3. The insulation board of claim 1 wherein the filler is an organic filler.

4. The insulation board of claim 1 wherein the filler is an inorganic filler.

5. The insulation board of claim 1 wherein the monomer and the oligomer are present in the monomeric composition at a level of 5 weight percent to 90 weight percent, and wherein the filler is present in the monomeric composition at a level of 5 weight percent to 95 weight percent.

6. The insulation board of claim 1 wherein the monomeric composition is further comprised of a dispersing aid for the filler.

7. The insulation board of claim 1 wherein the monomeric composition is further comprised of at least one agent selected from the group consisting of foaming agents, flow control agents, leveling agents, wetting agents, dispersing agents, defoamers, pigments, and biocides.

8. The insulation board of claim 1 wherein the polymeric composition is applied on the fiber mat at a level which is within the range of 2 g/ft² to 40 g/ft².

9. The insulation board of claim 1 wherein the fiber mat is a glass mat and wherein the glass mat weighs from 4 g/ft² to 12 g/ft².

10. The insulation board of claim 1 wherein the filler is a fire retardant.

11. The insulation board of claim 1 wherein the filler is aluminum trihydrate.

12. The insulation board of claim 1 wherein the filler is present in the monomeric composition at a level which is within the range of 30 weight percent to 50 weight percent.

13. The insulation board of claim 2 wherein the oligomer is selected from the group consisting of epoxy acrylate oligomers, urethane acrylate oligomers, and polyester acrylate oligomers.

14. The insulation board of claim 1 wherein the monomeric composition is void of silicon dioxide monospheres.

15. An insulation board having a non-elastic core and having at least one surface thereof bonded to an uncoated surface of a facer, wherein the insulation board has a thickness which is within the range of 0.2 inches to about 6 inches, wherein the non-elastic core is comprised of a foamed polymer selected from the group consisting of foamed polyurethane modified polyisocyanurate and foamed phenol-formaldehyde, wherein the facer is manufactured by a process comprising (1) applying a monomeric composition to a fiber mat, wherein the fiber mat is a non-asphaltic, non-cellulosic fiber mat, and wherein the monomeric composition is comprised of a monomer and a filler, wherein the monomer is selected from the group consisting of acrylate monomers and methacrylate monomers, wherein the filler is selected from the group consisting of organic fillers, clays, mica, talc, limestone, kaolin, gypsum, aluminum silicate, flame retardant aluminum trihydrate, ammonium sulfamate, antimony oxide, calcium silicate, calcium sulfate, zinc borate, and colemanite, wherein the monomeric composition consists substantially of solids, (2) initiating polymerization of the monomer within the monomeric composition by exposing the monomeric composition to an electron beam, and (3) allowing the monomer to polymerize to produce the flexible facer.

16. The insulation board of claim 1 wherein the foamed polymer is foamed polyurethane modified polyisocyanurate.

17. The insulation board of claim 1 wherein the foamed polymer is foamed phenol-formaldehyde.

* * * * *